Sept. 20, 1960    W. P. HENDERSON ET AL    2,953,253
WINDSHIELD CONTAINER
Filed Feb. 17, 1958    3 Sheets-Sheet 1

INVENTORS
WILLIAM P. HENDERSON
& VICTOR PERSHON
BY
Barnes, Kisselle, Raisch
& Choate
ATTORNEYS Sept. 20, 1960 W. P. HENDERSON ET AL 2,953,253
WINDSHIELD CONTAINER
Filed Feb. 17, 1958 3 Sheets-Sheet 2

INVENTORS
WILLIAM P. HENDERSON
& VICTOR PERSHON
BY
Barnes, Kisselle, Raisch & Choate
ATTORNEYS

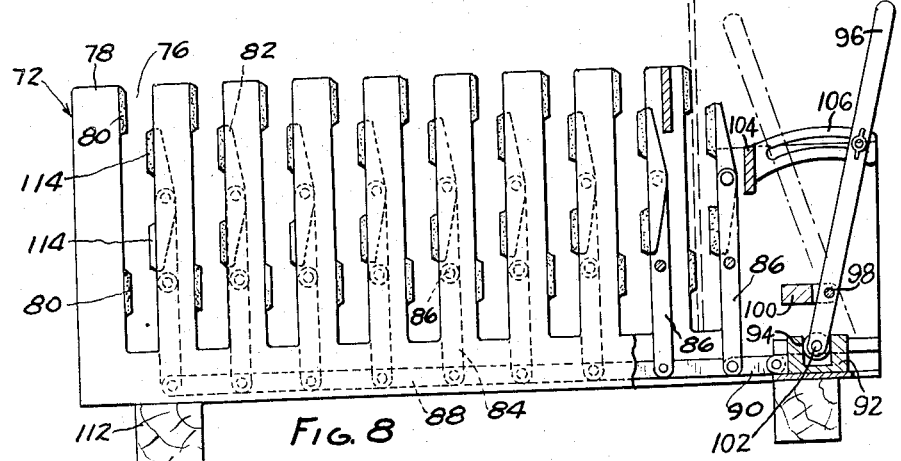
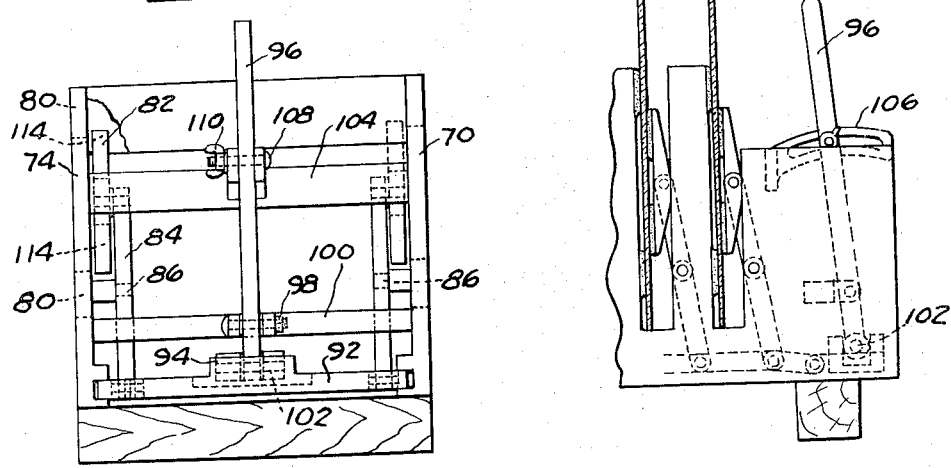
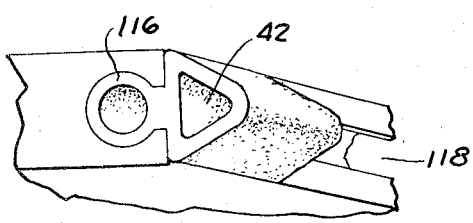

United States Patent Office 2,953,253
Patented Sept. 20, 1960

2,953,253
WINDSHIELD CONTAINER

William P. Henderson, Bloomfield Township, Oakland County, Mich., and Victor Pershon, Detroit, Mich. (Both of 1991 Woodward Ave., Berkley, Mich.)

Filed Feb. 17, 1958, Ser. No. 715,626
6 Claims. (Cl. 211—41)

This invention relates to racks or containers for shipping or storing glass panels and has to do more particularly with a rack or shipping container for curved vehicle windshields.

The windshields of present day cars vary considerably in size and shape. This presents storage and shipping problems. A dealer in such windshields necessarily has to stock many windshields of various sizes and shapes in order to be in a position to replace the damaged windshield of any vehicle. Periodically, the dealer has to order from the glass warehouse various windshields to maintain his stock at the desired level. This necessitates ordering one or two windshields of many different sizes and shapes. In view of the fact that the windshields vary considerably in size, curvature and shape, they are usually individually packed in cardboard containers and shipped to the dealer. With present day containers, it is impractical to nest numerous windshields in a single container and ship them to the dealer in this fashion.

Thus, the shipping costs of windshields are relatively high. This high shipping cost results not only from the cost of the individual containers which are used once and discarded, but also because of the labor involved in packing the windshields individually in a protected arrangement within a fiberboard container. Furthermore, during shipment, containers are often subjected to abusive handling; and breakage is therefore not uncommon. This also adds to the cost of the windshield. At the present time, there is a real need for a shipping container for windshields in which a plurality of windshields of different sizes and shapes may be readily arranged in a nested condition and shipped to the desired destination with a minimum possibility of breakage.

It is an object of the present invention to provide a container or rack of the above described type. The windshield container of the present invention is characterized in that it is designed to accommodate numerous windshields of various sizes and shapes. The container of the present invention is furthermore designed so that the windshields may be simply and quickly arranged therein in a manner so as to reduce breakage to a minimum. By providing a container in which numerous windshields of different shapes and sizes can be shipped, the savings effected by the container of the present invention over the individual packaging methods now employed is sufficient to warrant the expense of a container of the permanent type that is shipped back to the source after arrival at the destination.

In the drawings:

Figs. 5, 6 and 7 show several different forms of clamping pads which may be used on the container.

Fig. 8 is a side elevational view partly in section of a modified form of shipping container of the present invention, the container being shown in the condition for receiving the windshields.

Fig. 9 is a fragmentary side elevational view partly in section of the container shown in Fig. 8 with the windshields in the clamped position.

Fig. 10 is an end view of the shipping container shown in Figs. 8 and 9.

Figure 1:
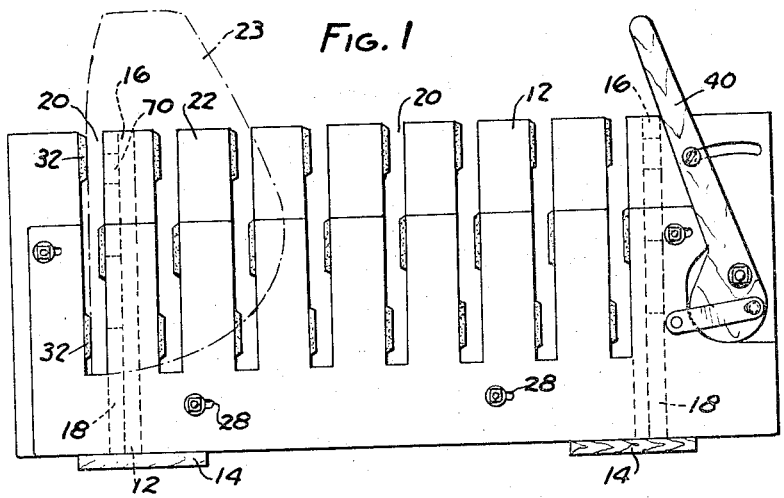
Fig. 1 is a side elevational view of a windshield shipping container of the present invention, the container being shown in a condition to receive the windshields.

Referring first to Figs. 1 through 4, the windshield shipping container there illustrated is formed of wood and includes a frame member 10 which comprises a pair of side panels 12 which are held upright in spaced apart relation by base plates 14 and inner transverse brace members 16 and 18. The frame formed by members 12, 14, 16 and 18 is of rectangular shape; and these members are secured together in a rigid manner so that the frame as a whole is very rigid. The two side panels 12 are fashioned with vertical slots or sockets 20 therein which extend downwardly from the upper edges of panels 12. The slots 20 in the two panels 12 are transversely aligned. The portions of panels 12 between successive slots 20 provide upright supports 22. The vertical extent of the slots 20 should preferably be at least slightly more than one-half of the vertical dimension of the windshields 23 to be shipped therein (see Fig. 1).

On the outer face of each side panel 12, there is slidably arranged a clamping member 24. The clamping members 24 are fashioned as slide plates and are slidably mounted on the side panels 12 by means of bolts 26 passing through both panels and arranged within horizontally elongated apertures 28 in slide plates 24. Each slide plate 24 is fashioned with a plurality of vertical slots or sockets 30 extending downwardly from the upper edge thereof. The spacing between slots 30 corresponds generally to the spacing between slots 20. Slots 20 and 30 preferably terminate at their lower ends in generally the same horizontal plane as at 31. However, the vertical extent of the upright supports 33 between successive slots 30 may be somewhat less than the vertical extent of the supports 22 as is clearly illustrated in Figs. 1 and 2.

One vertical side edge of each slot 20 is provided with a pair of clamping pads 32. One of the clamping pads 32 is located adjacent the upper end of slot 20 and the other adjacent the lower end of the slot. The opposite vertical side edge of each slot 30 is likewise provided with a clamping pad 34. Clamping pad 34 is arranged generally in a vertically central position between the two pads 32 so that when a windshield is arranged in the registering slots 20, 30 with the lower edge of the windshield resting on the edges 31, the slide plates 24 can be actuated so that the clamping pads 32 engage one face of the windshield at vertically spaced points and the clamping pad 34 engages the opposite face of the windshield at a point between the two pads 32.

Figure 5:
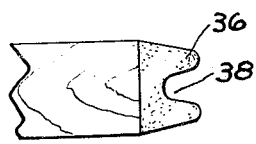
Figure 6:
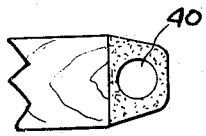

The function of the pads 32, 34 is to securely clamp the windshield without marring it and without breaking it. For this reason, it is preferred that the clamping pads 32, 34 be made of a compressible material such as rubber. Furthermore, these clamping pads are preferably designed so as to produce a readily distortable cross section. For example, in the showing in Fig. 5, each clamping pad is formed or rubber and comprises a pair of spaced apart vertically extending ribs or lips 36 separated by a groove 38. In the form of pad illustrated in Fig. 6, the pad is provided with a hollow central portion of circular shape as at 40. The pad shown in Fig. 7 has a triangular cross section and is fashioned with a hollow triangular core. Each of these forms of pads is readily distortable under clamping pressure against the glass windshield.

Figure 2:
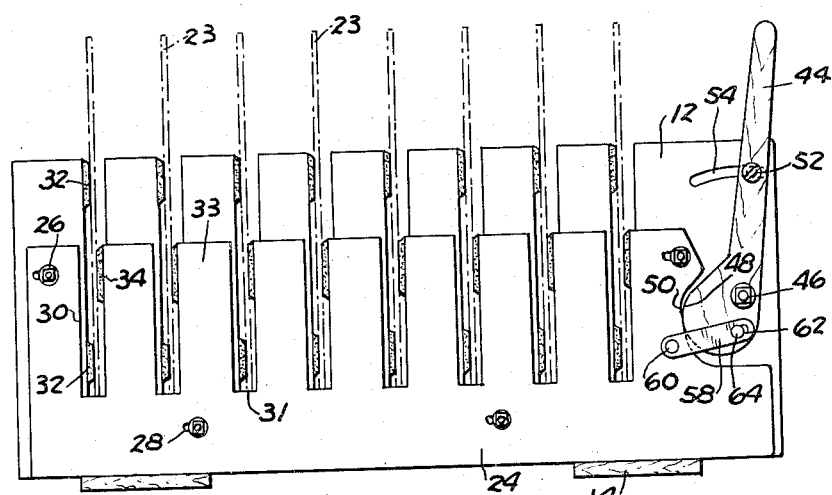
Fig. 2 is a view similar to Fig. 1 and showing the windshields clamped in place in the container.
Figure 3:
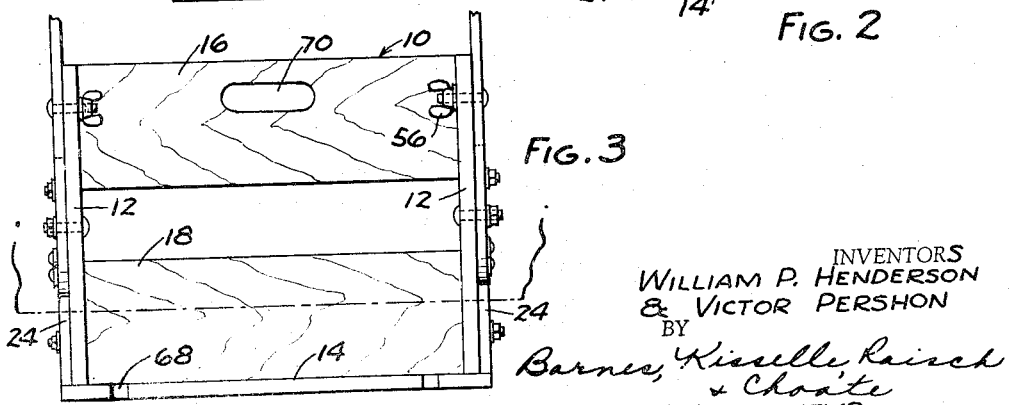
Fig. 3 is a fragmentary end elevational view of the container.

In order to bring the pads 32 and 34 into clamping relationship with the opposite faces of the windshields arranged in the registering slots of notches 20, 30, a mechanism is provided for shifting each slide plate 24 in a direction longitudinally of the frame. In the form of container illustrated in Fig. 4, this mechanism includes a pair of handles 44 each pivotally mounted as at 46 at one end of the side panels 12. The lower end of each handle 44 is fashioned with an eccentric cam surface 48. Each slide plate 24 is fashioned with an arcuate edge 50 that is engaged by the eccentric cam surface 48. When the handle 40 is pulled rearwardly from the position shown in Fig. 1 to that shown in Fig. 2, the cam surface 48 engages the arcuate edge 50 of the slide plate 24 to shift the slide plate forwardly, that is, in a direction to the left as shown in Figs. 1 and 2 so that the windshields 23 are clamped firmly between the clamping pads 32, 34.

A screw 52 in each handle 44 extends through an arcuate slots 54 in each side panel 12 and is provided with a wing nut 56 on the inner end thereof. When the handle 44 is actuated to clamp the windshields, it may be locked in this position by tightening wing nut 56. Links 58 pivoted on each slide plate 24 at one end thereof as at 60 are provided with slots 62 at the opposite end thereof through which pins 64 mounted on the lower ends of handles 44 project. When the handles 44 are pivoted forwardly from the position shown in Fig. 2 to that shown in Fig. 1, pin 64 engages the end of slots 62 to retract slide plate 24 and thereby release the windshields.

With this arrangement, the importance of the provision of the compressible pads 32, 34 will be appreciated. By forming these pads so that they can distort readily, each slide plate 24 and the pads 34 mounted thereon can be removed simultaneously into clamping relation with the windshields without any danger of breaking the windshields. Because of variations and dimensions either in the thickness of the various windshields or because of manufacturing tolerances in the shipping containers themselves, the most that will happen is that some of the pads will be compressed or distorted to a greater extent than others.

Figure 4:
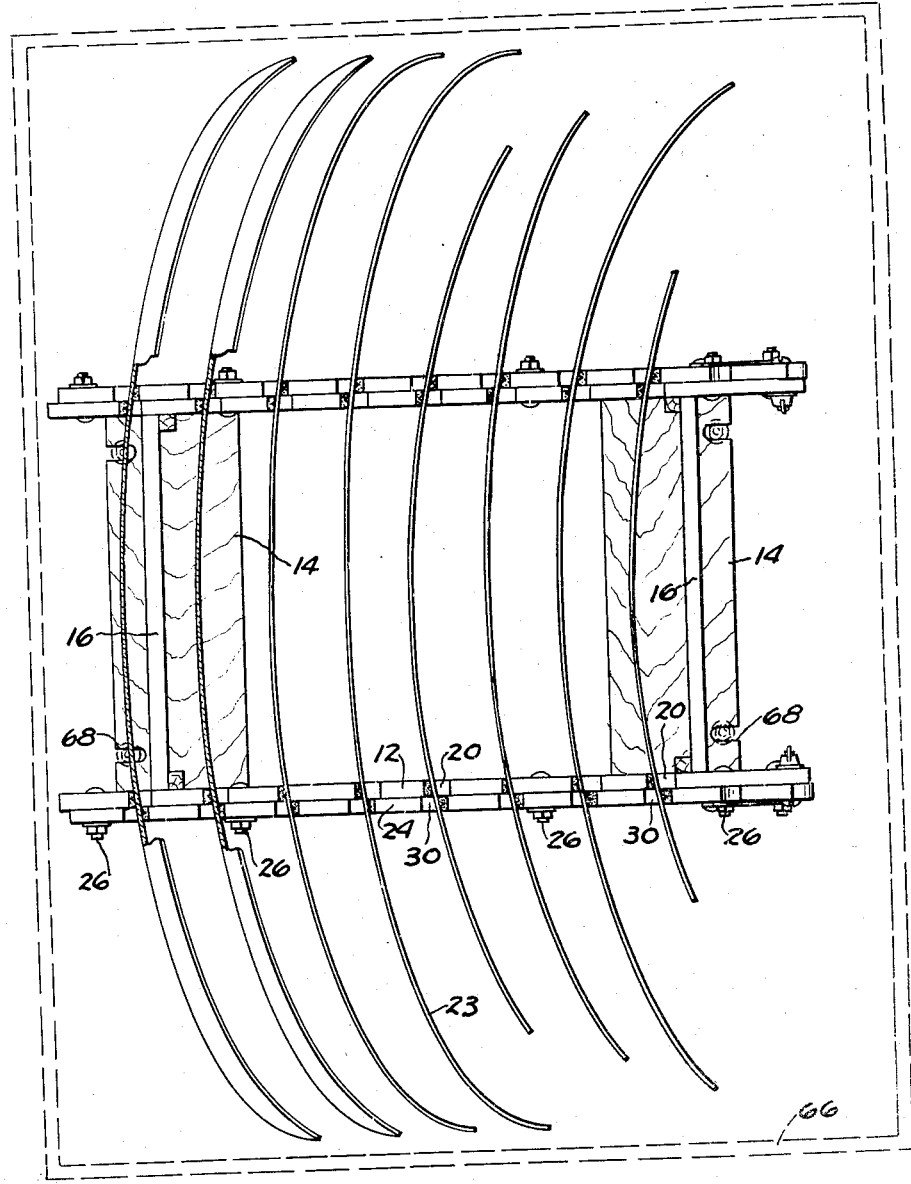
Fig. 4 is a top plan view of the container.

The shipping containers described can be individually boxed within an outer container 66 as shown in Fig. 4 if desired or may be permanently or temporarily mounted on the platform of a vehicle. The base plates 14 are provided with apertures 68 for mounting the shipping container on a base support, either the platform of a truck or the bottom wall of a shipping box as the case may be. In any event, it will be appreciated that windshields packed in the manner illustrated can be shipped or stored safely. In addition, by utilizing the successive slots and clamping the windshields in these slots, the container can accommodate windshields of different sizes and shapes as illustrated. Thus, a plurality of different sizes and shapes of windshields can be shipped or stored in the same shipping container. By designing the containers such that the windshields are gripped not near their ends but near the central portions thereof, the opposite ends of the windshields are free and can be arranged in a nested relation. As a matter of fact, the vertical slots 20, 30 can be spaced apart rather closely, even closer than shown in the drawings; and with such spacing, if the ends of a particular windshield are curved to such an extent that another windshield cannot be inserted into the next successive slot, the slot may simply be left empty without in any way affecting the clamping action in the other slots of the container.

With the windshields clamped as illustrated, they are rigidly supported against movement in any direction. The clamping pads 34, 36, being formed of rubber or any other compressible material that offers considerable frictional resistance to glass, prevent the windshields from shifting lengthwise in the slots 20, 30. As a matter of convenience, the upper inner brace panels 16 may be provided with hand holds 70, if desired. It will be appreciated that the labor involved in either loading or unloading the container disclosed with windshields is negligible.

In Figs. 8 through 10, there is shown another form of windshield shipping container constructed in accordance with the present invention. The form of container shown in Figs. 8 through 10 is designed to be fashioned as a casting, a high-strength aluminum casting, for example. This container includes a frame 72 having a pair of side panels 74 provided with vertical slots 76 to define upright supports 78 between successive slots. Each upright support has clamping pads 80 mounted thereon as shown.

In this form of construction, the clamping members are in the form of individual pressure bars 82, one adjacent each of the slots 76 on the two side panels 74. The pressure bars 82 are pivotally supported at the upper ends of vertically extending rocker arms 84. Each rocker arm is pivotally connected intermediate its ends on the adjacent supports 78 as at 86. The lower ends of all the rocker arms on each side of the container are connected to an actuator bar 88. The two bars 88 are mounted for reciprocation lengthwise of frame 72 and at one end thereof are connected by means of a short link 90 to a cross bar 92 having an enlarged bearing portion 94 at the center thereof. A handle 96 is pivotally mounted as at 98 on a cross brace 100 interconnecting it to side panels 74. The lower end of handle 96 is pivotally connected to the bearing block 94 as at 102. An upper cross brace 104 is fashioned with a slotted arcuate segment 106 through which a screw 108 on handle 96 projects. A wing nut 110 is threaded on the end of screw 108 and is adapted to be tightened so as to lock handle 96 in adjusted position. Frame 72 is designed to be mounted on any suitable supporting base such as a pallet frame 112. Frame 72 can be used in the same manner as described above with reference to the form of shipping container shown in Figs. 1 through 4.

With the arrangement shown in Figs. 8 through 10, windshields to be shipped or stored are simply positioned vertically in the slots 76; and after they are arranged in place, handle 96 is pivoted from the position shown in Fig. 8 to the position shown in Fig. 9 to firmly clamp the windshields between the pressure pads 80 on the supports 78 and the pressure pads 114 on the pressure bars 82. It will be appreciated, of course, that as illustrated in Figs. 8 and 9, when handle 96 is pivoted counterclockwise, actuator bar 88 is shifted to the right and rocker arms 84 pivot counterclockwise about their pivotal axes 86 to bring the pressure pads 114 into clamping engagement with the windshields arranged vertically within the slots 78. The pressure pads 80, 114, may be fashioned similar to those previously described. However, in the arrangement shown in Figs. 8 and 9, wherein the various members are formed as castings, these pressure pads may be formed of extruded rubber as shown in Fig. 7 with an enlargement 116 along the inner edge thereof that is adapted to engage within a correspondingly shaped groove 118 in supports 78 and pressure bars 82.

It will be observed that in windshield containers constructed in accordance with the present invention, the windshields are not gripped or held at their edges. In the arrangements shown herein, the pressure applied to the windshields for holding them firmly in position is applied to the panels at locations spaced inwardly from their edges. This reduces to a minimum the possibility of breakage.

We claim:

1. A rack for shipping and storing glass panels comprising a frame having a base and a pair of laterally spaced, vertically extending side panels thereon, each side panel having means thereon forming a plurality of vertically extending notches therein spaced longitudinally of the side panels, said notches extending downwardly from the upper edges of said side panels, the notches in the two panels being laterally aligned so that a windshield can be arranged in each aligned pair of notches in an upright position, each notch having one vertical side edge thereof provided with compressible pad means for engaging one face of the windshield arranged in the aligned notches, a plurality of clamping members on said side panels, at least one adjacent each of said notches, and means for moving said clamping members toward and away from said pad means to engage the opposite face of the windshields in the aligned notches and thereby rigidly clamp the windshields on said frame in spaced relation, said clamping members comprising a plurality of levers pivotally mounted on said side panels, one adjacent each of said notches, said levers being adapted to be actuated so that one end portion of each lever projects across a notch toward said vertical side edge of said notch, said means for moving said clamping members comprising an actuating bar connected with the opposite end portion of said levers and a leverage mechanism for axially shifting said actuating bar.

2. The combination called for in claim 1 wherein each of said levers has a pressure bar pivotally mounted at said one end thereof, said pressure bars having compressible pad means thereon for engaging said opposite face of the windshields in said notches.

3. A rack for shipping and storing glass windshield panels for vehicles of the type which are curved both transversely and vertically comprising a main frame having a base and a pair of upright longitudinally extending and transversely spaced side panels fixed on the base, said side panels each including a series of longitudinally disposed notches therein, said notches extending vertically downwardly from the upper edges of the side panels for a distance substantially less than the vertical dimension of a windshield to be used with said rack, the notches in one side panel being transversely aligned with the notches in the other side panel and having a width substantially greater than the thickness of the windshield panel to be used therewith so that a plurality of said curved windshield panels can be arranged vertically one in each of said notches, an auxiliary frame on said main frame and having a plurality of side members thereon positioned directly adjacent the side panels of said main frame, said side members being shiftably mounted for movement longitudinally of said main frame from a position directly adjacent one vertical side edge of the notches, across said notches and toward the opposite vertical side edges of the notches, said last mentioned vertical side edges of the notches having readily compressible friction pad means thereon spaced upwardly from the lower ends of said notches, said side members of the auxiliary frame also having readily compressible friction pad means thereon spaced upwardly from the lower ends of said notches, at least one of said two sets of pad means having an effective vertical span sufficient to engage one side of a glass windshield panel arranged within said notch at relatively widely vertically spaced points inwardly of the upper and lower edges of the windshield panel and the other set of pad means being disposed to engage the opposite face of the windshield panel, when said side members are shifted toward said last mentioned vertical side edges of the notches, between the points at which the glass is engaged by the first mentioned set of pad means, and means for shifting said side members in said last mentioned direction to firmly engage the opposite faces of the windshield panel at points spaced inwardly from the upper and lower edges of the panel with said two sets of pad means and for locking said side members in said glass engaging position.

4. A shipping and storage rack for glass windshield panels of the type called for in claim 3 wherein said means for shifting the side members of said auxiliary frame includes a manually operable lever operatively connected with said side members by force multiplying means.

5. A rack for shipping and storage of glass windshield panels of the type called for in claim 3 wherein said side members are integral with said auxiliary frame and are fixedly mounted for movement in unison.

6. A rack for shipping and storing glass windshield panels for vehicles of the type which are curved both transversely and vertically comprising a main frame having a base and a pair of upright longitudinally extending and transversely spaced side panels fixed on the base, said side panels each including a series of longitudinally disposed notches therein, said notches extending vertically downwardly from the upper edges of the side panels for a distance substantially less than the vertical dimension of a windshield to be used with said rack, the notches in one side panel being transversely aligned with the notches in the other side panel and having a width substantially greater than the thickness of the windshield panel to be used therewith so that a plurality of said curved windshield panels can be arranged vertically one in each of said notches, an auxiliary frame movably mounted on said main frame and having a plurality of side members thereon shiftable for movement longitudinally of the main frame across said notches and toward one set of vertical side edges of the notches, said last mentioned vertical side edges of the notches having readily compressible friction pad means thereon spaced upwardly from the lower ends of said notches, said side members of the auxiliary frame also having readily compressible friction pad means thereon spaced upwardly from the lower ends of said notches, said two sets of pad means being disposed to engage the opposite faces of a windshield panel in a set of aligned notches when the side members of the auxiliary frame are shifted toward the last mentioned vertical side edges of the notches and means for shifting the side members in said last mentioned direction to firmly engage the opposite faces of the windshield at points spaced inwardly from the upper and lower edges of the panel with said two sets of pad means and for retaining said side members in said glass engaging position.

References Cited in the file of this patent
UNITED STATES PATENTS

| | | |
|---|---|---|
| 271,827 | Flynn | Feb. 6, 1883 |
| 1,028,978 | Tobbenboske | June 11, 1912 |
| 1,055,723 | Dickson | Mar. 11, 1913 |
| 1,221,584 | Patrick | Apr. 3, 1917 |